United States Patent [19]

Kasper

[11] Patent Number: 4,986,378

[45] Date of Patent: Jan. 22, 1991

[54] MACHINE CONFIGURATION AND METHOD FOR STEERING A VEHICLE AWAY FROM A WALL

[75] Inventor: Joseph G. Kasper, Golden Valley, Minn.

[73] Assignee: Tennant Company, Minneapolis, Minn.

[21] Appl. No.: 319,355

[22] Filed: Mar. 6, 1989

[51] Int. Cl.⁵ ............................................. B62D 11/02
[52] U.S. Cl. .................... 180/6.48; 180/6.66; 180/168
[58] Field of Search .................. 180/168, 6.5, 6.66, 180/216, 167, 6.48, 6.64, 65.1; 364/424.02

[56] References Cited

U.S. PATENT DOCUMENTS

| | | | |
|---|---|---|---|
| 2,957,533 | 10/1960 | Lewis et al. | 180/6.48 |
| 3,563,327 | 2/1971 | Mier | 180/168 X |
| 3,628,624 | 12/1971 | Wesener | 180/168 |
| 3,901,339 | 8/1975 | Williamson | 180/6.48 |
| 4,119,164 | 10/1978 | Fogg, Jr. et al. | 180/6.5 |
| 4,275,394 | 6/1981 | Mabuchi et al. | 180/168 X |
| 4,280,578 | 7/1981 | Perkins | 180/6.5 |
| 4,483,405 | 11/1984 | Noda et al. | 180/6.5 |
| 4,700,427 | 10/1987 | Knepper | 180/169 X |
| 4,709,771 | 12/1987 | Basham et al. | 180/6.5 |
| 4,729,449 | 3/1988 | Holmquist | 180/168 |
| 4,790,402 | 12/1988 | Field et al. | 180/169 |

FOREIGN PATENT DOCUMENTS 0150407 7/1987 Japan .............................. 364/424.02
2101769 1/1983 United Kingdom ................ 180/168

Primary Examiner—Charles A. Marmor
Assistant Examiner—Brian L. Johnson
Attorney, Agent, or Firm—Kinzer, Plyer, Dorn, McEachran & Jambor

[57] ABSTRACT

A machine configuration which permits readily maneuvering a vehicle away from a wall or line of objects that the vehicle has been traveling close to, or closely following the walls around an inside corner. The vehicle has a frame carrying two rear drive wheels and one or more front caster wheels. The drive wheels are individually driven by separate motors. The drive wheels are inset from the sides of the machine so that turning maneuvers can be made adjacent a wall without the wheels contacting the wall. The rear frame or structure of the machine is disposed within an envelope defined such that turning maneuvers adjacent a wall unit will not bring the rear structure into contact with the wall. With the steering geometry and frame construction set up in this manner, the vehicle can be turned away from the wall by operating the drive motors at differential rates, and no part of the vehicle will touch the wall. The vehicle can also follow closely along an inside corner of two walls.

17 Claims, 4 Drawing Sheets

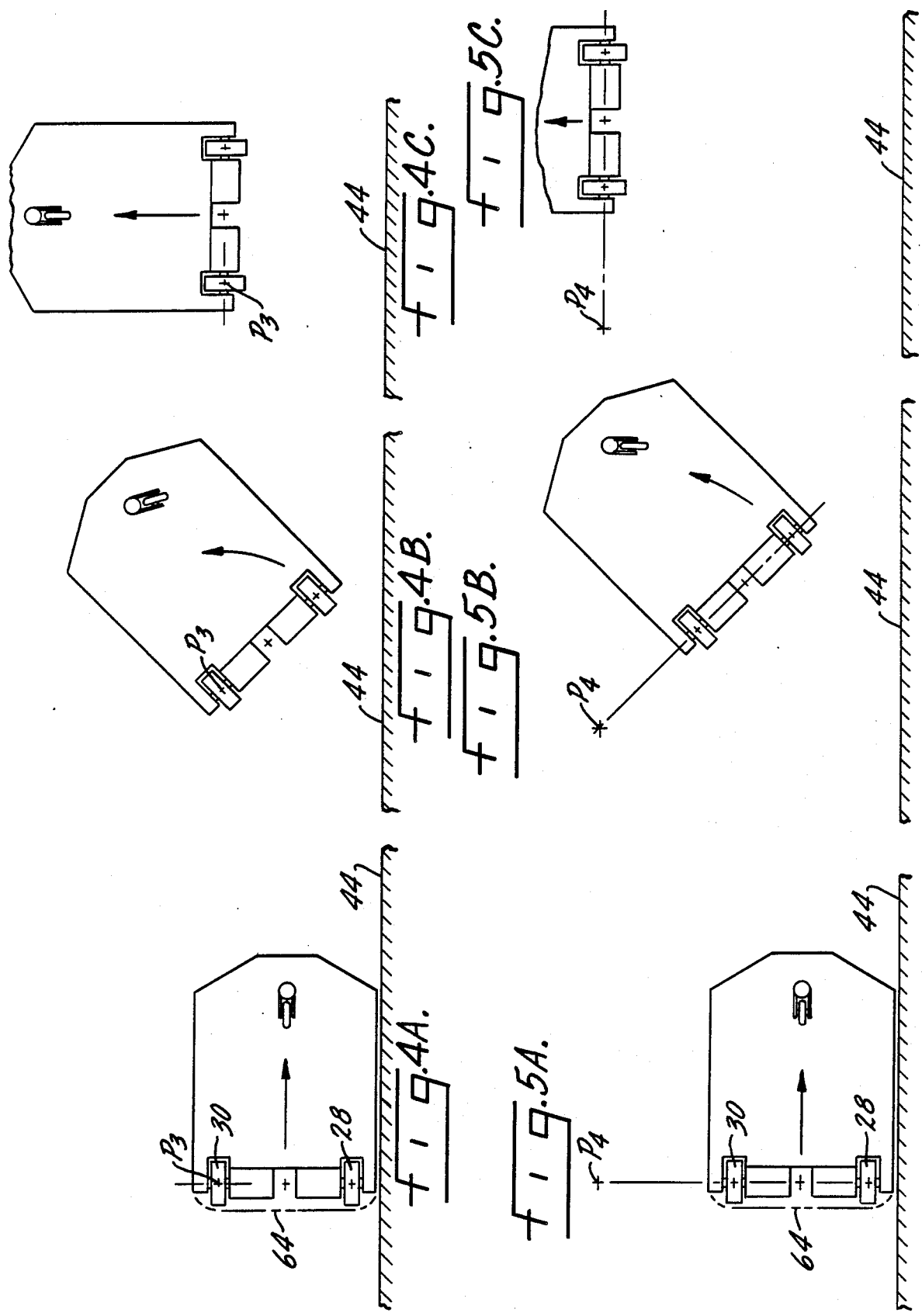

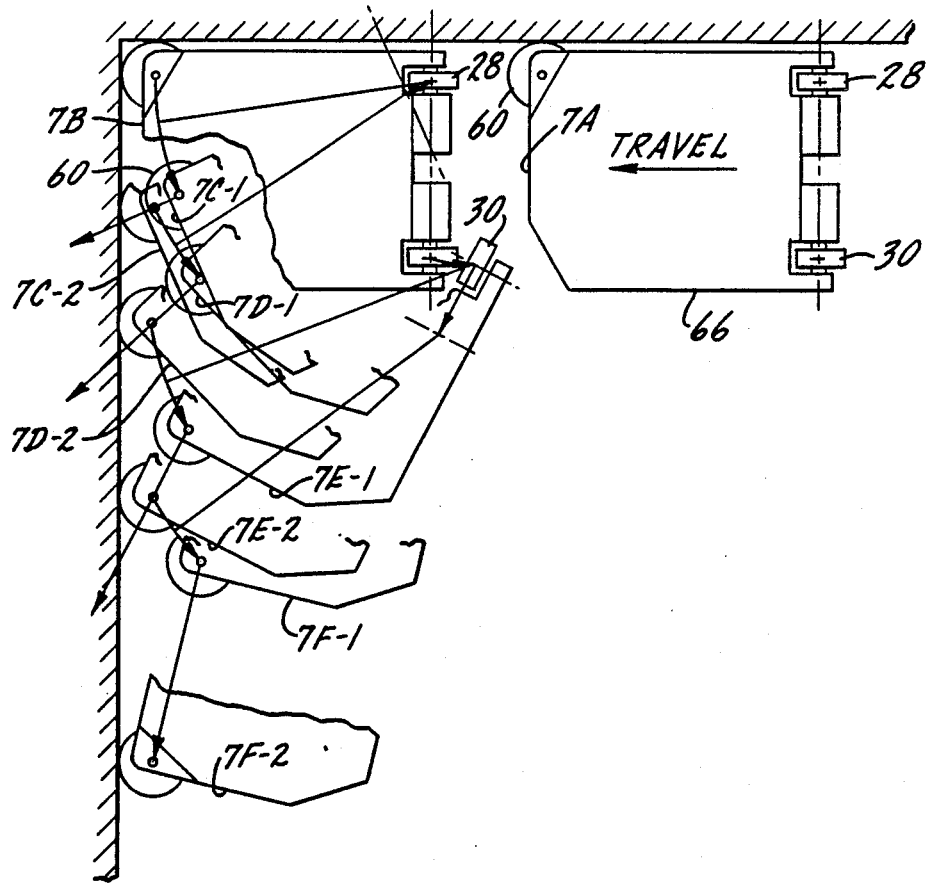

MACHINE CONFIGURATION AND METHOD FOR STEERING A VEHICLE AWAY FROM A WALL

BACKGROUND OF THE INVENTION

This invention relates to a steering geometry and machine configuration for a vehicle. It is particularly concerned with unmanned, automated vehicles used for floor maintenance such as sweepers, scrubbers, vacuum cleaners and the like, although it is also applicable to machines that carry an operator.

Many conventional manned floor maintenance machines typically have three wheels; two idlers in front and a steerable driving wheel in the rear. The nature of a floor machine's work routinely requires that it operate along a wall and as close as possible to it. A variation on this is operating as close as possible to boxes, furniture, or other items beside the path of the machine. This presents much the same problem as operating along a wall, so only a wall will be referred to. At some point it usually becomes necessary to turn the machine away from the wall. However, with a conventional, rear steered vehicle this maneuver causes the rear end of the machine to swing toward the wall, or into it if the driver is careless. For such a machine to turn away from a wall there has to be significant space between the machine and the wall before the turn is made. Such a machine cannot get away from a wall at all if there is no significant space there.

The approved technique for handling this maneuver on a rear steered manned vehicle is to slow down and steer a little bit away from the wall, swinging the rear corner of the machine almost into contact with the wall. The operator must then drive forward carefully, and gradually turn the steering wheel to hold the rear corner of the machine almost on the wall. The machine must travel along the wall for a number of feet while it slowly moves out on a tightening spiral course and finally has enough room to complete a normal radius turn. The maneuver requires considerable travel distance along the wall. It also requires a progressive steering response by the operator and careful manipulation to avoid scraping the wall or knocking over anything that may be stacked along an aisle.

The progressive response of a human operator produces a turn that has a constantly changing pivot point and radius. Incorporating this progressive response into the steering system of an unmanned vehicle is a formidable technical problem. It would require constant measurement of the separation between the wall and the closest part of the machine to the wall, with a variable steering control to hold that separation constant. Such constant measurement becomes virtually impossible when the machine is not operating along a continuous wall, but rather along the edge of an aisle bordered by intermittent vertical objects such as stacked boxes of various heights, or furniture. Therefore, duplication of human steering in an unmanned vehicle is a complex design problem. The present invention avoids the problem by configuring a vehicle in a manner which makes it much more maneuverable than conventional machines. It can be easily turned away from a wall at any reasonable speed, which eliminates the need for steering controls that measure clearances and progressively turn the vehicle. If desired, the vehicle may be turned about a fixed pivot point at a constant rate of turn, which further simplifies the control problem. The result is a more maneuverable, simpler, more economical machine which is more easily adapted to automated steering control. The invention can also provide a person-carrying vehicle which can be steered away from a wall by its operator more easily than can current rear steered vehicles.

Floor maintenance machines have also encountered a problem in trying to completely clean a floor in a corner of a room. The steering limitations of conventional machines as discussed above prevent them from driving completely into an inside corner, then turning immediately and following the second wall. A turn away from the first wall must be started some distance from the corner in order to be completed by the time the second wall is reached. A large area of floor in the corner will be untouched by the machine and must be cleaned by hand. The machine configuration of the present invention solves this problem. It allows the floor maintenance machine to drive along a wall all the way into an inside corner, then turn and follow the second wall. It will thus clean most of the floor area in a corner that a conventional machine leaves untouched.

SUMMARY OF THE INVENTION

This invention relates to a machine configuration which permits maneuvering a vehicle away from a wall that it has been traveling close to and which also permits improved maneuvering in a walled corner.

One of the objects of the invention is a vehicle configuration which permits turning the vehicle away from a wall that it has been traveling close to at any reasonable speed in minimum travel distance, while assuring that no part of the vehicle will strike the wall.

Another object is a turning method that is relatively easy to control and is suitable for use on an unmanned, automated vehicle.

Another object of the invention is a vehicle configuration which permits the vehicle to operate along the edge of an aisle, close to objects placed beside that aisle, and turn away from those objects without any part of the vehicle striking any of the objects.

A further object of the invention is a turning method of the type described that does not require the use of steerable wheels.

Another object is a floor maintenance machine which can be operated closer to a wall than previous floor maintenance machines, while still being able to be turned away from the wall at any reasonable speed without striking the wall.

Another object is a method for maneuvering a vehicle whereby the machine can be turned 180° in an aisle only slightly wider than the greatest diagonal length of the machine.

Another object is a machine configuration for a floor cleaning machine and a method of operating the machine which permit it to clean the floor area in a corner of a room more completely and with less maneuvering than previous machines.

Other objects may appear in the following specification.

The vehicle of the present invention has a frame mounted on first and second rear drive wheels and one or more front caster wheels. Two variable-speed drive motors independently power the rear drive wheels. The motors operate in both the forward and reverse directions Operating the motors at differential rates and/or directions of rotation causes the machine to turn. Thus, steering control is achieved by controlling the rotational speed and direction of the two drive motors. Such motor control is well adapted for use in an unmanned vehicle. It can also be used in a vehicle which carries an operator by employing a suitable control system. One suitable system is disclosed in U.S. Pat. No. 4,709,771, the disclosure of which is incorporated herein by reference.

The vehicle is configured in such a way that no part of its frame or drive wheels will scrape a wall or object along an aisle even under the most severe turning condition. The drive wheels and the rear member of the frame are disposed within an envelope defined by a clearance line which will be defined in the detailed description of the invention. The most severe pivoting condition results from driving the wheel farthest from the wall in reverse while holding the wheel nearest the wall stationary. The machine can be turned 90° away from the wall in this manner about a fixed pivot point which is the center of the rear wheel nearest to the wall. The severe turn can then be continued for another 90° by driving forwardly the wheel which was held stationary and holding stationary the wheel which was driven in reverse. This total combined maneuver results in a 180° turn, which can be accomplished without scraping the walls in an aisle that is only slightly wider than the greatest diagonal length of the vehicle.

The severe 90° turn away from a wall as described above does not require any travel distance along the wall for its execution. It is therefore possible to follow closely along a wall all the way into a corner of a room or other area until the front of the machine is almost touching the intersecting wall and then turn the machine away from the first wall. It can then closely follow the second wall of the room starting right in the corner. Almost all of the floor area in the corner can thus be cleaned in one pass. This is a significant improvement over conventional rear steer machines, which must either start turning while still some distance from the corner, and so leave a substantial floor area that must be cleaned by hand, or move back and forth into the corner several times to clean it out.

The steering technique of driving one rear wheel while not driving the other, or of driving them at differential speeds, can be accomplished with relatively simple controls, which provide an economical system for an automated vehicle. The proper placement of the rear wheels and the constraints on the frame configuration are keys to making the turns possible without hitting a wall, while permitting a minimum clearance with the wall before the turn.

BRIEF DESCRIPTION OF THE DRAWINGS

FIGS. 4A–4C is a floor maintenance machine according to the present invention shown in a sequence of positions executing a third type of turn away from a wall.

FIGS. 5A–5C is a floor maintenance machine according to the present invention shown in a sequence of positions executing a fourth type of turn away from a wall.

FIG. 7 is the floor maintenance machine of FIG. 6 shown in a sequence of positions for sweeping out a corner.

DETAILED DESCRIPTION OF THE INVENTION

Figure 1:
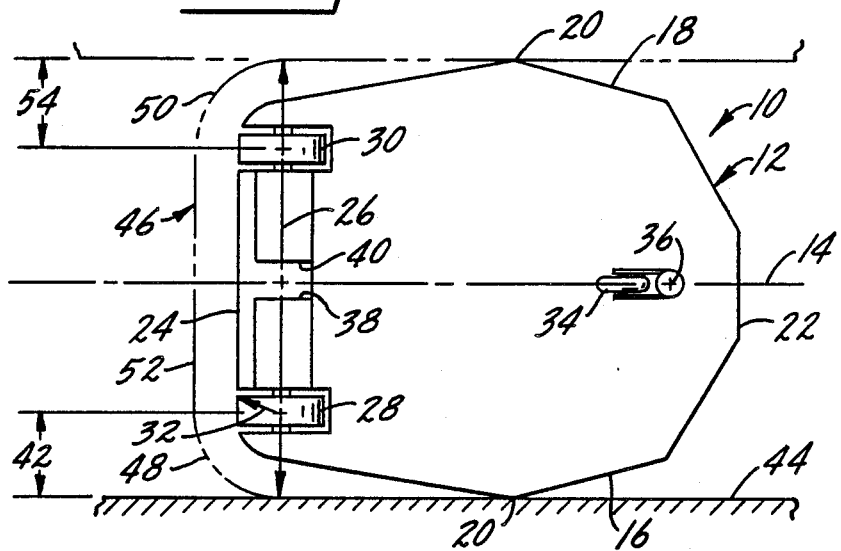
FIG. 1 is a plan view of the outline of an unmanned floor maintenance machine according to the present invention.

FIG. 1 is a schematic diagram of a floor maintenance machine according to the present invention. The machine 10 has a frame 12 having a central longitudinal axis 14. The frame includes first and second side members 16 and 18. In the form shown, the side members are angled outwardly somewhat to define extreme edges 20. The frame 12 further includes a front member 22 and a rear member 24. The rear member is defined as any portion of the machine disposed behind the rear axle line 26.

The vehicle 10 includes first and second drive wheels 28 and 30 mounted on the frame near the rear member 24. The tires in the embodiment shown are solid tires having a rectangular cross-section. Obviously, pneumatic tires could also be used. The tires have a dimension which will be defined herein as the long radius of the tire. The long radius is the longest radius of the tire. In the solid tires shown, it is the distance from the center of the tire to one of its corners. It is illustrated in FIG. 1 at 32. In a pneumatic tire without sharp corners it might be a radius to the center of the tread. The drive wheels 28 and 30 support the rear portion of the machine frame. The front portion of the frame is supported by a forward wheel 34. This wheel is preferably in the form of a caster which can swivel freely about a vertical pivot 36. This one caster wheel could be replaced by two or more spaced apart caster wheels in the forward portion of the vehicle without changing the nature of the invention.

First and second drive motors 38 and 40 are mounted on the rear of the frame. The motors individually drive the first and second drive wheels 28 and 30, respectively. The motors can be operated individually at variable speeds and in both the forward and reverse rotational directions.

It will be understood that a floor maintenance machine would include appropriate brooms, brushes, a dirt hopper, a vacuum system and related equipment to perform the desired task. These items are not shown. Further, an unmanned vehicle will include a guidance system of some type. For example, a guidance system such as that shown in pending U.S. Patent application Serial No. 07/262,281, filed Oct. 25, 1988, and assigned to the present assignee, could be used. Further, the motor controls referred to in that application could be appropriate for use in this invention. The disclosure of pending application Serial No. 07/262,281 is incorporated herein by reference.

The guidance system uses pre-existing overhead lights. The vehicle, when operating in an unmanned mode, senses the presence of the overhead lights along its course with an on-board video camera. Other on-board equipment repeatedly samples the video image, converts it into a point location at the median center of each light and provides successive (x,y) coordinate locations of these points as the vehicle moves along.

These observed locations are compare by an on-board computer to successive locations obtained in a similar fashion and stored in on-board memory during a preparatory or teaching mode trip previously made along the selected route. During the teaching mode trip the machine was manually driven precisely along the desired route so the successive locations obtained and stored at that time were along the correct course. During unmanned operation any variance of the observed locations from the previously recorded locations will produce a steering correction that will bring the vehicle back to the intended course.

The motor control subsystem may be a commercially available motor controller, for example the model DMC-200 programmable two-axis DC motor controller made by Galil Motion Control, Inc. of Mountain View, Calif. The controller must selectively control velocity or position of the two drive motors 38 and 40, utilizing appropriate feedback such as from incremental encoders coupled to either the motors or the wheels. Outputs from the controller are fed through amplifiers to first and second drive motors 38 and 40. These are connected to the drive wheels 28 and 30 through reduction gear boxes. Optical encoders are coupled to the motors to provide position feedback of the wheels from which the distance actually travelled may be determined when needed, and to provide a ratio of right and left wheel rotations.

The location of the drive wheels is chosen such that they will not contact a wall even under the most severe turning condition. To ensure this result, each wheel must have an inset line which is at least as long as the long radius of the wheel. One inset line is shown at 42 in FIG. 1. It is defined as the minimum possible distance between the vertical centerline of the rear wheel 28 and a wall or side of an aisle 44, measured perpendicular to the vertical centerline of the rear wheel 28 and also to the machine's longitudinal axis 14 when the machine's longitudinal axis 14 is parallel to the wall for the duration of the turn. A similar inset line 54 is shown for wheel 30 on the other side of the machine. It would apply when that side of the machine was traveling close to a wall.

Figure 6:
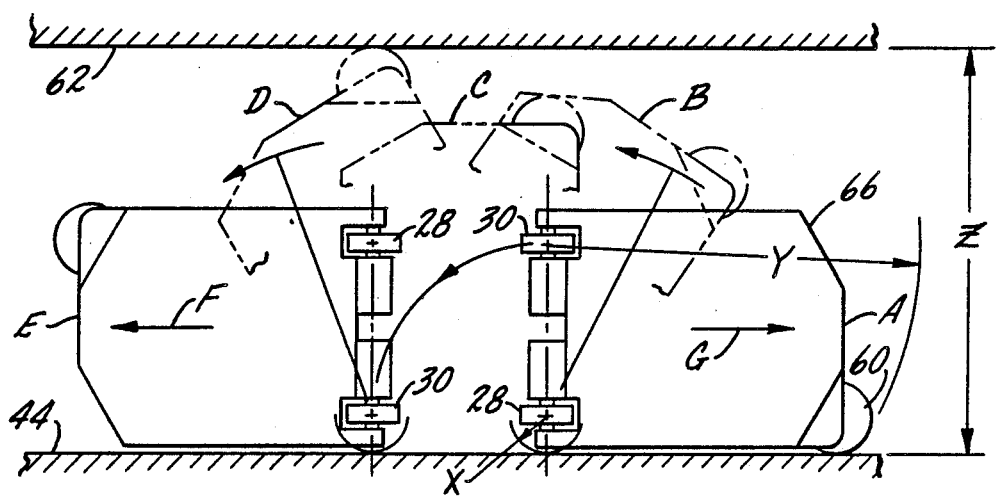
FIG. 6 is a further alternate form of a floor maintenance machine according to the present invention shown in a sequence of positions during a 180° turn in the narrowest possible aisle.

The minimum distance or separation between the wheel center and the wall may depend on a variety of factors relating to the machine design. In FIG. 1 the minimum distance of the inset line 42 is dictated by the extreme point 20 of the side frame 16. Since the side member 16 is angled outwardly, the inset line 42 is longer than the distance between the wheel center and the edge of the side frame in the vicinity of the drive wheels. In the vehicles of FIGS. 2A-5A the side frame is straight and the length of the inset line is equal to the distance from the wheel center to the side frame plus a minimum clearance to the wall. In the machine of FIGS. 2A-5A the straight side member is the limiting factor in the separation between the wheel center and the wall. In FIG. 6 the floor maintenance machine is shown equipped with a side brush 60. The side brush may be the limiting factor in the separation between the wheel center and the wall. In other machines the guidance system may be the limiting factor, rather than some physical component of the machine. That is, the guidance system may have sensors which detect the wall and limit the machine's approach to it. Or even if the guidance system does not directly detect or sense the machine's position relative to the wall, the guidance system may be set up such that the machine can never approach closer than a given distance to the wall. Whatever the limiting factor may be, the minimum separation between a wall and the center of the drive wheel nearest to the wall of a machine running parallel to the wall defines the inset line. Locating the first and second drive wheels such that they have inset lines at least as long as the long radius of the wheels ensures that the wheels will never contact the wall while turning away from it. This is a key element of the invention.

A second area of concern is the rear end of the machine and particularly the area where the rear member joins the side members. Interference between these portions of the machine and a wall during a turn of 90° or less can be avoided by disposing the rear member of the frame within an envelope defined by a clearance line. The clearance line for the machine configuration of FIG. 1 is shown at 46. The clearance line is defined by a first arc 48, a second arc 50 and a rear line 52 that is behind the rear axle line 26, the rear line 52 being tangent to and joining the two arcs 48 and 50. The first arc 48 is described by swinging a radius equal to the inset line 42 about the vertical centerline of the first drive wheel 28. Similarly, the second arc 50 is described by swinging a radius equal to the inset line 54 of the second drive wheel about its vertical axis. The rear line 52 is tangent to the arcs 48 and 50. Another key element of the invention is that with the frame members disposed within this clearance line, the machine can be turned as much as 90° away from the wall 44 about a fixed pivot point by operating the drive means at differential rates for the duration of the turn and no part of the machine will strike the wall. By differential rates it is meant that the drive motors are operated at different rotational speeds or in different rotational directions, or some combination of different speeds and directions.

It will be noted that the location of the clearance line depends on the length of the inset lines. Various tradeoffs can be made in the machine design which will affect the shape of the clearance line. For example, the configuration of FIG. 1 has somewhat widened side members which lengthen the inset lines and move the clearance line rearwardly. This permits mounting machine parts behind the rear wheel edges. However, this machine cannot get its centerline as close to the wall as, say, the alternate design of FIG. 2A. The vehicle 56 of FIG. 2A, with its straight side frame members 58, can have its inset lines equal to the long radius of the wheels plus a minimum clearance between the machine and the wall. This is the limiting condition and is a preferred arrangement, but other configurations are possible.

Various possibilities for turning maneuvers are shown in FIGS. 2A-C through 5A-C. A floor maintenance machine is shown at 56. It differs from the machine 10 of FIG. 1 only in that the side members 58 of the frame are straight rather than angled. The other parts of the machine are the same. Since all portions of the machine are disposed within the clearance line 64 for this frame configuration, no part of the machine will contact the wall 44 during the turn.

Figure 2C:
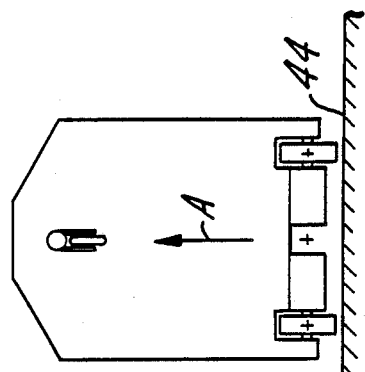
FIGS. 2A–2C shows an alternate form of a floor maintenance machine according to the present invention in a sequence of three positions during a turn.
Figure 2B:
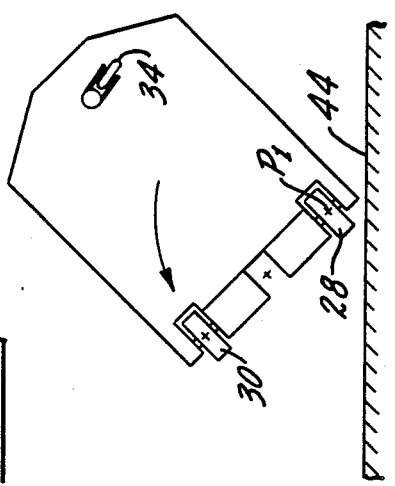
Figure 2A:
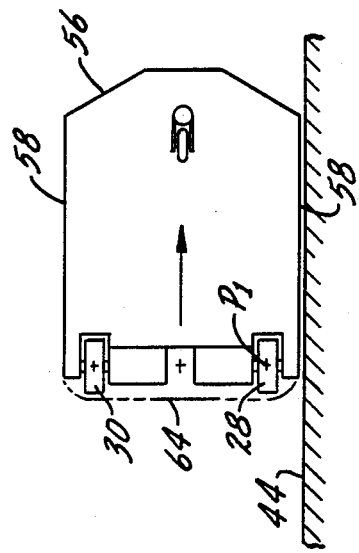

The most severe or sharpest turning condition is shown in FIG. 2A-2C. Position A shows the machine 56 as close to the wall 44 as it can get. A gap is shown in the drawings to indicate that the machine has minimum clearance but is not actually touching the wall. Position A is at the start of a 90° left turn. The turn is effected by stopping the drive motor for the right wheel 28 and driving the left wheel 30 in a reverse direction. The machine pivots about the vertical centerline of the right wheel. This point is shown at P1. Position B of FIG. 2B shows the machine about halfway through the turn. Position C shows the machine upon completion of a 90° turn, ready to move away from the wall in the direction of arrow A. The drive motor for wheel 30 may operate at a constant speed if desired, or at varying speeds if preferred, and the center point of the turn remains fixed at P1.

Figure 3C:
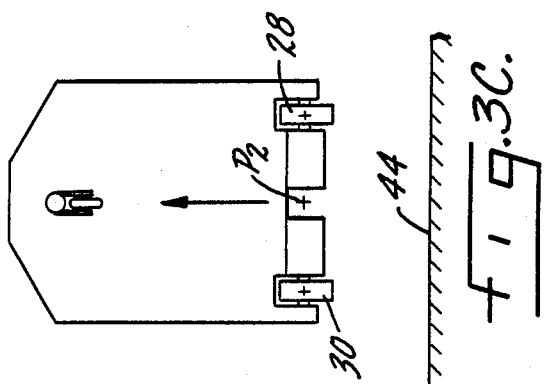
FIGS. 3A–3C is a plan view of a floor maintenance machine according to the present invention shown in a sequence of positions of a second type of turn.
Figure 3B:
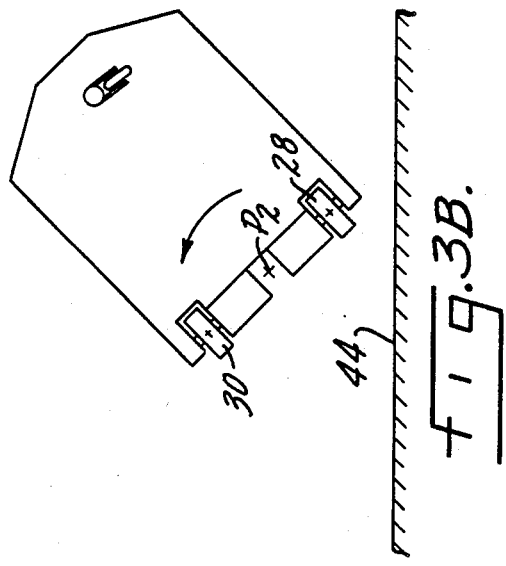
Figure 3A:
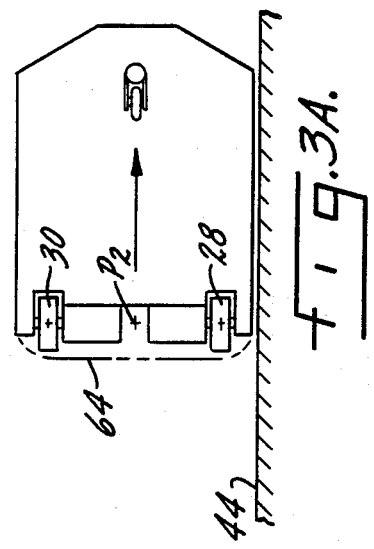

FIGS. 3A–3C show a second method for turning the machine away from a wall. Here the machine pivots about a fixed center point $P_2$. The point is halfway between the centers of the drive wheels. The turn is effected by driving the right wheel 28 forwardly and the left wheel 30 backwardly, both at the same speed. This motion continues until the machine reaches the position C. Then both motors are driven forwardly to move the machine away from the wall.

The turn of FIGS. 4A–4C is made by stopping the motor for the left wheel 30 and continuing to move the right wheel 28 forwardly. This results in a turn about pivot point $P_3$. FIGS. 5A–5C show a fourth variation of turning away from a wall. Here both drive wheels continue to move forwardly, but the right wheel 28 is driven at a higher rate. This results in a turn about some fixed pivot point $P_4$. In all cases the machine moves away from the wall without any part of the machine striking the wall. Left turns away from a wall along the right side of the machine are illustrated, but obviously right turns away from a wall along the left side of the machine can be made equally well by reversing the procedures.

FIG. 6 illustrates the minimum width aisle or corridor in which a machine designed according to the present invention can be completely turned around. Here a machine 66 is the same as machine 56 of FIG. 2 except that side brush 60 has been added. It is initially located in position A after traveling in the direction of arrow G with side brush 60 limiting the approach of the machine to the wall 44. The machine then executes a 90° turn through position B to position C. This turn is effected in the manner illustrated in FIG. 2 by stopping the right drive wheel 28 and driving the left wheel 30 backwardly. Then a second 90° turn is made by holding the left wheel 30 fixed and driving the right wheel 28 forwardly through position D to position E. From position E the machine can move forwardly in the direction of arrow F. Position D illustrates the minimum width Z between first wall 44 and a second wall 62 in which the machine can make a 180° turn. This width is equal to radius X plus radius Y plus a minimum clearance along wall 62. Radius X is equal to the inset line from wheel 28 to wall 44. Radius Y is the radius of an arc swung about the center of left wheel 30 that just clears all the structure at the front of the machine. In the case shown, the critical clearance is side brush 60. Such maneuverability in close quarters is important in floor machines, and can be readily achieved by means of this invention.

It can be seen that the turns illustrated in FIGS. 2–5 take progressively more space for completing the turn. But in each case, the turn is effected by turning the machine about a fixed pivot point with the drive motors operating at differential rates each may be constant for the duration of the turn. The steering controls for an automated guided vehicle can be programmed to select the appropriate rates to effect a particular type of turn. If these rates are held constant throughout the duration of the turn, there is no need to adjust the motor speeds. Consequently, the progressive turning control described earlier for a manned machine is avoided. Further since the machine is laid out within the clearance line defined for a particular frame configuration, the turn can be completed without having to check for proximity of the machine to the wall, and can be accomplished with no risk of damage to the machine or to the wall. These factors simplify the design of an unmanned floor maintenance machine and ease the steering job for the operator of a manned machine.

It was mentioned earlier that a floor maintenance machine configured according to the present invention is capable of cleaning out a walled corner, such as the corner of a room, more effectively than a current rear steer floor machine can. FIG. 7 shows successive stages in this procedure. Machine 66 is first shown in position 7A, traveling along a first wall and approaching a corner. It is fully in the corner at position 7B, with side brush 60 touching the second wall. It is then turned away from the first wall to position 7C-1 by holding wheel 28 stationary and rotating wheel 30 in reverse until side brush 60 is a few inches away from the second wall. The machine is then moved forward to position 7C-2 by rotating both drive wheels equally until side brush 60 again touches the second wall. Another turn swung about wheel 28 produces position 7D-1, and moving forward until the side brush again touches the wall gives position 7D-2. At this point the diagonal length of the machine from the side brush to drive wheel 30 has passed a perpendicular to the second wall, and it becomes more efficient to pivot about drive wheel 30. Therefore wheel 30 is held stationary and wheel 28 is rotated forward to obtain position 7E-1, after which the machine is moved forward to position 7E-2. This is repeated to obtain positions 7F-1 and 7F-2, and so on until the machine is traveling along the second wall. Throughout the maneuver the side brush is adjacent to the wall, or within a few inches of it. Also, the increments of turning and moving forward can be reduced, and they can be blended into one smooth track by turning and moving forward simultaneously so that the side brush will be held essentially adjacent to the wall all the way. Practically all of the floor area in the corner will be cleaned in one pass, which is a significant improvement over the performance of conventional rear steered machines.

The primary factor which makes possible this improved performance is the ability to turn away from the first wall without any forward travel after the machine has been driven completely into the corner. The subsequent maneuvering to get it in position along the second wall can be done in several different ways, but the abrupt turn away from the first wall is essential, and it can only be done because of the configuration of the machine; i.e., the inset locations of the drive wheels and the limitation of the clearance line as described earlier.

This invention has been described as applied primarily to floor maintenance machines. However, one skilled in the art of industrial vehicle design will recognize that the invention is not limited to floor maintenance machines. If desired, it might be advantageously applied to vehicles serving other purposes if the nature of their use involves traveling closely along walls or similar structures. For example, such vehicles as personnel carriers and cargo carts might be designed to incorporate the invention. It will be realized that other alterations and applications could also be made without departing from the scope of the following claims.

I claim:

1. In a vehicle of the type having a frame defining a longitudinal axis and including first and second side members connected by front and rear members, first and second drive wheels mounted on the frame near the rear member, the rotational axes of the first and second drive wheels being fixed in perpendicular relation to said longitudinal axis, at least one forward wheel mounted on the frame near the front member, first and second drive means individually driving the first and second drive wheels respectively, an improved method of maneuvering the vehicle away from a wall without hitting the wall when the vehicle is initially traveling parallel to the wall and as close as possible to the wall, comprising the steps of:

(a) locating the first and second drive wheels such that each has an inset line at least as long as the long radius of the drive wheel from the center of which the inset line is measured;

(b) disposing the rear member of the frame within an envelope defined by a first arc described by swinging a radius equal to the inset line of the first drive wheel outwardly and rearwardly about a vertical axis through the center of said first drive wheel, by a second arc described by swinging a radius equal to the inset line of the second drive wheel outwardly and rearwardly about a vertical axis through the center of said second drive wheel, and by a rear vertical plane tangent to the two arcs; and (c) turning the vehicle away from the wall about a fixed pivot point by operating the first and second drive means at differential rates for the duration of the turn.

2. The method of claim 1 further characterized in that the drive means of the drive wheel initially nearest the wall is operated at a higher rate than the other drive means.

3. The method of claim 1 further characterized in that the drive means of the drive wheel initially farthest from the wall is stopped while the other drive means continues to operate.

4. The method of claim 1 further characterized in that the drive means of the drive wheel initially farthest from the wall is operated in reverse and the other drive means continues to operate in a forward direction.

5. The method of claim 1 further characterized in that the drive means of the drive wheel initially farthest from the wall is operated in reverse and the other drive means is stopped.

6. The method of claim 1 further characterized in that the first and second drive means are operated at constant rates for the duration of the turn.

7. The method of claim 1 wherein the wall is characterized by a line of objects.

8. In an automated, unmanned floor maintenance machine of the type having a frame defining a longitudinal axis and including first and second side members connected by front and rear members, first and second drive wheels mounted on the frame near the rear member, the rotational axes of the first and second drive wheels being fixed in perpendicular relation to said longitudinal axis, at least one forward wheel mounted on the frame near the front member, first and second drive means individually driving the first and second drive wheels respectively, an improved method of maneuvering the machine away from a wall without hitting the wall when the machine is initially traveling parallel to the wall and as close as possible to the wall, comprising the steps of:

(a) locating the first and second drive wheels such that each has an inset line at least as long as the long radius of the drive wheel from the center of which the inset line is measured;

(b) disposing the rear member of the frame within an envelope defined by a first arc described by swinging a radius equal to the inset line of the first drive wheel outwardly and rearwardly about a vertical axis through the center of said first drive wheel, by a second arc described by swinging a radius equal to the inset line of the second drive wheel outwardly and rearwardly about a vertical axis through the center of said second drive wheel, and by a rear vertical plane tangent to the two arcs; and (c) turning the machine away from the wall about a fixed pivot point by operating the first and second drive means at differential rates for the duration of the turn.

9. The method of claim 8 further characterized in that the drive means of the drive wheel initially nearest the wall is operated at a higher rate than the other drive means.

10. The method of claim 8 further characterized in that the drive means of the drive wheel initially farthest from the wall is stopped while the other drive means continues to operate.

11. The method of claim 8 further characterized in that the drive means of the drive wheel initially farthest from the wall is operated in reverse and the other drive means continues to operate in a forward direction.

12. The method of claim 8 further characterized in that the drive means of the drive wheel initially farthest from the wall is operated in reverse and the other drive means is stopped.

13. The method of claim 8 further characterized in that the first and second drive means are operated at constant rates for the duration of the turn.

14. The method of claim 8 wherein the wall is characterized by a line of objects.

15. In an automated, unmanned floor maintenance machine of the type having a frame defining a longitudinal axis and including first and second side members connected by front and rear members, first and second drive wheels mounted on the frame near the rear member, the rotational axes of the first and second drive wheels being fixed in perpendicular relation to said longitudinal axis, at least one forward wheel mounted on the frame near the front member, first and second drive means individually driving the first and second drive wheels respectively, and means for performing floor maintenance, an improved method of maneuvering the machine without a portion of the frame hitting a wall so as to maintain a floor in a corner of a walled area having a first wall and a second wall intersecting with the first wall, comprising the steps of:

(a) locating the first and second drive wheels such that each has an inset line at least as long as the long radius of the drive wheel from the center of which the inset line is measured;

(b) disposing the rear member of the frame within an envelope defined by a first arc described by swinging a radius equal to the inset line of the first drive wheel outwardly and rearwardly about a vertical axis through the center of said first drive wheel, by a second arc described by swinging a radius equal to the inset line of the second drive wheel outwardly and rearwardly about a vertical axis through the center of said second drive wheel, and by a rear vertical plane tangent to the two arcs;

(c) operating the machine parallel and adjacent to the first wall and moving it toward the intersection of the first and second walls until the foremost portion of the machine in the direction of movement is adjacent to the second wall;

(d) thereafter turning the machine away from the first wall by rotating the drive wheel farthest from the first wall in reverse while preventing rotation of the drive wheel nearest to the first wall; and (e) thereafter maneuvering the machine to position it adjacent to the first and second walls, with its longitudinal axis parallel to the second wall, the machine being headed away from the intersection of the first and second walls.

16. A vehicle capable of maneuvering away from a wall without hitting the wall when the vehicle is initially traveling parallel to the wall and as close as possible to the wall, comprising:

a frame defining a longitudinal axis and including first and second side members connected by front and rear members;

first and second drive wheels mounted on the frame near the rear member, the rotational axes of the first and second drive wheels being fixed in perpendicular relation to said longitudinal axis, the first and second drive wheels being positioned such that each has an inset line at least as long as the long radius of the drive wheel from the center of which the inset line is measured;

at least one forward caster wheel mounted on the frame near the front member;

first and second drive means individually driving the first and second drive wheels respectively;

the rear member of the frame being disposed within an envelope defined by a first arc described by swinging a radius equal to the inset line of the first drive wheel outwardly and rearwardly about a vertical axis through the center of said first drive wheel, by a second arc described by swinging a radius equal to the inset line of the second drive wheel outwardly and rearwardly about a vertical axis through the center of said second drive wheel, and by a rear vertical plane tangent to the two arcs.

17. An automated, unmanned floor maintenance machine capable of maneuvering away from a wall without hitting the wall when the vehicle is initially traveling parallel to the wall and as close as possible to the wall, comprising:

a frame defining a longitudinal axis and including first and second side members connected by front and rear members;

first and second drive wheels mounted on the frame near the rear member, the rotational axes of the first and second drive wheels being fixed in perpendicular relation to said longitudinal axis, the first and second drive wheels being positioned such that each has an inset line at least as long as the long radius of the drive wheel from the center of which the inset line is measured;

at least one forward caster wheel mounted on the frame near the front member;

first and second drive means individually driving the first and second drive wheels respectively;

means for performing floor maintenance mounted on the frame;

the rear member of the frame being disposed within an envelope defined by a first arc described by swinging a radius equal to the inset line of the first drive wheel outwardly and rearwardly about a vertical axis through the center of said first drive wheel, by a second arc described by swinging a radius equal to the inset line of the second drive wheel outwardly and rearwardly about a vertical axis through the center of said second drive wheel, and by a rear vertical plane tangent to the two arcs.

* * * * *